No. 777,547. Patented December 13, 1904.

UNITED STATES PATENT OFFICE.

LEIGH ROY SCHAAP, OF LOVELAND, COLORADO, ASSIGNOR TO THE NATIONAL BRAZING COMPOUND COMPANY, OF DENVER, COLORADO.

BRAZING COMPOUND.

SPECIFICATION forming part of Letters Patent No. 777,547, dated December 13, 1904.

Application filed July 28, 1904. Serial No. 214,538. (No specimens.)

*To all whom it may concern:*

Be it known that I, LEIGH ROY SCHAAP, a citizen of the United States, residing at Loveland, county of Larimer, and State of Colorado, have invented a certain new and useful Brazing Compound; and I do declare the following to be a full, clear, and exact description of the invention, such as will enable others skilled in the art to which it appertains to make and use the same.

My invention relates to a composition of matter to be used for brazing purposes, being adapted for use in brazing or joining metal parts which heretofore have been considered impossible or difficult to unite in this manner.

By the use of my improved compound I am enabled to satisfactorily braze cast-iron, aluminium, and copper, as well as other metals. Cast-iron, aluminium, and copper are impossible to braze by the use of ordinary brazing compounds; but by the use of my improvement the work may be quickly and satisfactorily accomplished. The compound is not only adapted for use for brazing purposes, but also for tempering, welding, and hardening metals as well.

My improved compound consists of prussiate of potash, plaster-of-paris, wood-charcoal, and citric acid in combination with borax or boracic acid. The term "prussiate of potash" as above employed is intended to include both "yellow prussiate of potash" and "red prussiate of potash." These are the terms commonly employed when referring to these ingredients. The more accurate or technical terms, however, are "potassium ferrocyanid" for the yellow prussiate of potash and "potassium ferricyanid" for the red prussiate of potash. Whenever the term "prussiate of potash" is used in this specification, it must be considered to include both the yellow and red species. The yellow prussiate of potash or potassium ferrocyanid, however, is preferred.

While I do not limit the invention to exact proportions, good results are obtained by using the following proportions of the various elements: prussiate of potash, two ounces; plaster-of-paris, two ounces; wood-charcoal, one-half ounce; citric acid, one ounce; borax, two ounces. These elements are ground to a powder and mixed to form a homogeneous compound.

In using, the two metal parts to be brazed or connected are first raised to a brazing heat in any suitable manner. The compound in the form of a powder is then applied to the joint or division where the two parts are to be united. The flux or brazing metal, as brass, is then applied to the joint and being melted by the heat passes between the two parts to be connected. The prussiate of potash prepares the parts for the proper performance of the brazing function.

Having thus described my invention, what I claim is—

1. A brazing compound consisting of prussiate of potash, plaster-of-paris, wood-charcoal, citric acid and borax combined in suitable proportions.

2. The herein-described composition of matter consisting of prussiate of potash two ounces; plaster-of-paris two ounces; wood-charcoal one-half ounce; citric acid one ounce; and borax two ounces.

3. A brazing compound consisting of yellow prussiate of potash, plaster-of-paris, wood-charcoal, citric acid and borax combined in suitable proportions.

4. The herein-described composition of matter consisting of yellow prussiate of potash two ounces; plaster-of-paris two ounces, wood-charcoal one-half ounce; citric acid one ounce; and borax two ounces.

In testimony whereof I affix my signature in presence of two witnesses.

LEIGH ROY SCHAAP.

Witnesses:
 DENA NELSON,
 A. J. O'BRIEN.